US008891797B2

(12) United States Patent
Thiergart et al.

(10) Patent No.: US 8,891,797 B2
(45) Date of Patent: Nov. 18, 2014

(54) AUDIO FORMAT TRANSCODER

(75) Inventors: Oliver Thiergart, Forchheim (DE); Cornelia Falch, Nuremberg (DE); Fabian Kuech, Erlangen (DE); Giovanni Del Galdo, Heroldsberg (DE); Juergen Herre, Buckenhof (DE); Markus Kallinger, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 362 days.

(21) Appl. No.: 13/289,252

(22) Filed: Nov. 4, 2011

(65) Prior Publication Data

US 2012/0114126 A1 May 10, 2012

Related U.S. Application Data

(63) Continuation of application No. PCT/EP2010/056252, filed on May 7, 2010.

(30) Foreign Application Priority Data

May 8, 2009 (DE) .................................. 09 006 291

(51) Int. Cl.

*H04R 11/04* (2006.01)
*G06F 17/00* (2006.01)
*G10L 21/0272* (2013.01)
*G10L 19/008* (2013.01)

(52) U.S. Cl.

CPC ........... *G10L 21/0272* (2013.01); *G10L 19/008* (2013.01)
USPC ............................................ 381/356; 700/94

(58) Field of Classification Search

CPC .......................... G10L 19/008; G10L 21/0272
USPC ............ 381/92, 310, 17, 106, 309, 1; 700/94; 379/202.01; 348/14.8
See application file for complete search history.

(56) References Cited

U.S. PATENT DOCUMENTS 7,260,524 B2 8/2007 Jabri et al.
8,340,315 B2 12/2012 Kantola et al.
(Continued)

FOREIGN PATENT DOCUMENTS

EP 1 890 456 2/2008
JP 2008543143 11/2008
(Continued)

OTHER PUBLICATIONS

Engdegard J. et al.: "Spatial Audio Object Coding (SAOC)—The Upcoming MPEG Standard on Parametric Object Based Audio Coding", 124th AES Convention, May 17, 2008, p. 1-15, XP002541458.

(Continued)

*Primary Examiner* — Fan Tsang
*Assistant Examiner* — Eugene Zhao
(74) *Attorney, Agent, or Firm* — Michael A. Glenn; Perkins Coie LLP

(57) ABSTRACT

An audio format transcoder for transcoding an input audio signal, the input audio signal having at least two directional audio components. The audio format transcoder including a converter for converting the input audio signal into a converted signal, the converted signal having a converted signal representation and a converted signal direction of arrival. The audio format transcoder further includes a position provider for providing at least two spatial positions of at least two spatial audio sources and a processor for processing the converted signal representation based on the at least two spatial positions to obtain at least two separated audio source measures.

12 Claims, 11 Drawing Sheets

(56) References Cited

U.S. PATENT DOCUMENTS

| | | | | |
|---|---|---|---|---|
| 2008/0219485 | A1 | 9/2008 | Kantola et al. | |
| 2008/0298610 | A1 * | 12/2008 | Virolainen et al. | 381/307 |
| 2009/0116652 | A1 * | 5/2009 | Kirkeby et al. | 381/1 |
| 2009/0129609 | A1 * | 5/2009 | Oh et al. | 381/92 |
| 2010/0169103 | A1 * | 7/2010 | Pulkki | 704/500 |

FOREIGN PATENT DOCUMENTS

| | | |
|---|---|---|
| JP | 2008543144 | 11/2008 |
| RU | 2335022 | 9/2008 |
| WO | WO-2005/078707 | 8/2005 |
| WO | WO-2006/024977 | 3/2006 |

OTHER PUBLICATIONS

Kallinger, Markus et al.: "Spatial filtering using directional audio coding parameters" Acoustics, Speech and Signal Processing, Apr. 19, 2009, p. 217-220, XP031459205.

Pulkki Ville: "Directional Audio Coding in Spatial Sound Reproduction and Stereo Upmixing", AES 28th International Conf., Jun. 30, 2006, p. 1-8, XP002522413.

"Information technology—MPEG audio technologies—Part 2: Spatial Audio Object Coding (SAOC)", ISO/IEC JTC 1/SC 29 N, ISO/IEC FDIS 23003-2:2010(E), Mar. 10, 2010, 133 pages.

Engdegard, et al., "Spatial Audio Object Coding (SAOC)—The Upcoming MPEG Standard on Parametric Object Based Audio Coding", AES Convention Paper, Presented at the 124th Convention, Amsterdam, The Netherlands, May 17-20, 2008, 13 pages.

Faller, et al., "Binaural Cue Coding—Part II: Schemes and Applications", IEEE Transactions on Speech and Audio Processing, vol. 11, No. 6, Nov. 2003, pp. 520-531.

Faller, C. , "Parametric Joint-Coding of Audio Sources", AES Convention Paper 6752, Presented at the 120th Convention, Paris, France, May 20-23, 2006, 12 pages.

Herre, et al., "From SAC to SAOC—Recent Developments in Parametric Coding of Spatial Audio", Illusions in Sound, AES 22nd UK Conference, Apr. 2007, 8 pages.

Herre, et al., "MPEG Surround—The ISO/MPEG Standard for Efficient and Compatible Multi-Channel Audio Coding", AES Convention Paper 7084, Presented at the 122nd Convention, Vienna, Austria, May 5-8, 2007, 23 pages.

* cited by examiner

AUDIO FORMAT TRANSCODER

CROSS-REFERENCE TO RELATED APPLICATIONS

This application is a continuation of copending International Application No. PCT/EP2010/056252, filed May 7, 2010, which is incorporated herein by reference in its entirety, and additionally claims priority from European Application No. EP 09 006 291.0, filed May 8, 2009, which is also incorporated herein by reference in its entirety.

The present invention is in the field of audio format transcoding, especially the transcoding of parametric encoding formats.

BACKGROUND OF THE INVENTION

Recently, several parametric techniques for the encoding of multi-channel/multi-object audio signals have been proposed. Each system has unique advantages and disadvantages w.r.t. its characteristics such as the type of parametric characterization, dependence/independence from a specific loudspeaker setup etc. Different parametric techniques are optimized for different encoding strategies.

As an example, the Directional Audio Coding (DirAC) format for the representation of multi-channel sound is based on a downmix signal and side information containing direction and diffuseness parameters for a number of frequency subbands. Due to this parametrization, the DirAC system can be used to easily implement e.g. directional filtering and in this way to isolate sound that originates from a particular direction relative to a microphone array used to pick up the sound. In this way, DirAC can also be regarded as an acoustic front-end that is capable of certain spatial processing.

As a further example, Spatial Audio Object Coding (SAOC) ISO/IEC, "MPEG audio technologies—Part. 2: Spatial Audio Object Coding (SAOC)", ISO/IEC JTC1/SC29/WG11 (MPEG) FCD 23003-2, J. Herre, S. Disch, J. Hilpert, O. Hellmuth: "From SAC to SAOC—Recent Developments in Parametric Coding of Spatial Audio", 22$^{nd}$ Regional UK AES Conference, Cambridge, UK, April 2007, J. Engdegård, B. Resch, C. Falch, O. Hellmuth, J. Hilpert, A. Hölzer, L. Terentiev, J. Breebaart, J. Koppens, E. Schuijers and W. Oomen: "Spatial Audio Object Coding (SAOC)—The Upcoming MPEG Standard on Parametric Object Based Audio Coding", 124$^{th}$ AES. Convention, Amsterdam 2008, Preprint 7377, is a parametric coding system that represents audio scenes containing multiple audio objects in a bitrate-efficient way.

Here, the representation is based on a downmix signal and parametric side information. In contrast to DirAC, which aims at representing the original spatial sound scene as it was picked up by the microphone array, SAOC does not aim at reconstructing a natural sound scene. Instead, a number of audio objects (sound sources) are transmitted and are combined in an SAOC decoder into a target sound scene according to the preferences of the user at the decoder terminal, i.e. the user can freely and interactively position and manipulate each of the sound objects.

Generally, in multi-channel reproduction and listening, a listener is surrounded by multiple loudspeakers. Various methods exist to capture audio signals for specific setups. One general goal in the reproduction is to reproduce the spatial composition of an originally recorded signal, i.e. the origin of individual audio source, such as the location of a trumpet within an orchestra. Several loudspeaker setups are fairly common and can create different spatial impressions. Without using special post-production techniques, the commonly known two-channel stereo setups can only recreate auditory events on a line between the two loudspeakers. This is mainly achieved by so-called "amplitude-panning", where the amplitude of the signal associated to one audio source is distributed between the two loudspeakers depending on the position of the audio source with respect to the loudspeakers. This is usually done during recording or subsequent mixing. That is, an audio source coming from the far-left with respect to the listening position will be mainly reproduced by the left loudspeaker, whereas an audio source in front of the listening position will be reproduced with identical amplitude (level) by both loudspeakers. However, sound emanating from other directions cannot be reproduced.

Consequently, by using more loudspeakers that are positioned around the listener, more directions can be covered and a more natural spatial impression can be created. The probably most well known multi-channel loudspeaker layout is the 5.1 standard (ITU-R775-1), which consists of 5 loudspeakers, whose azimuthal angles with respect to the listening position are predetermined to be 0°, ±30° and ±110°. That means, that during recording or mixing the signal is tailored to that specific loudspeaker configuration and deviations of a reproduction set up from the standard will result in decreased reproduction quality.

Numerous other systems with varying numbers of loudspeakers located at different directions have also been proposed. Professional systems, especially in theaters and sound installations, also include loudspeakers at different heights.

According to the different reproduction set-ups, several different recording methods have been designed and proposed for the previously mentioned loudspeaker systems, in order to record and reproduce the spatial impression in the listening situation as it would have been perceived in the recording environment. A theoretically ideal way of recording spatial sound for a chosen multi-channel loudspeaker system would be to use the same number of microphones as there are loudspeakers. In such a case, the directivity patterns of the microphones should also correspond to the loudspeaker layout, such that sound from any single direction would only be recorded with a small number of microphones (1, 2 or more). Each microphone is associated to a specific loudspeaker. The more loudspeakers used in reproduction, the narrower the directivity patterns of the microphones have to be. However, narrow directional microphones are rather expensive and typically have a non-flat frequency response, degrading the quality of the recorded sound in an undesirable manner. Furthermore, using several microphones with too broad directivity patterns as input to multi-channel reproduction results in a colored and blurred auditory perception due to the fact that sound emanating from a single direction would usually be reproduced with more loudspeakers than may be used as it would be recorded with microphones associated to different loudspeakers. Generally, currently available microphones are best suited for two-channel recordings and reproductions, that is, these are designed without the goal of a reproduction of a surrounding spatial impression.

From the point of view from microphone-design, several approaches have been discussed to adapt the directivity patterns of microphones to the demands in spatial-audio-reproduction. Generally, all microphones capture sound differently depending on the direction of arrival of the sound to the microphone. That is, microphones have a different sensitivity, depending on the direction of arrival of the recorded sound. In some microphones, this effect is minor, as they capture sound almost independently of the direction. These microphones are generally called omnidirectional microphones. In a typical microphone design, a secular diaphragm is attached to a small airtight enclosure. If the diaphragm is not attached to the enclosure and sound reaches it equally from each side, its directional pattern has two lobes. That is, such a microphone captures sound with equal sensitivity from both front and back of the diaphragm, however, with inverse polarities. Such a microphone does not capture sound coming from the direction coincident to the plane of the diaphragm, i.e. perpendicular to the direction of maximum sensitivity. Such a directional pattern is called dipole, or figure-of-eight.

Omnidirectional microphones may also be modified into directional microphones, using a non-airtight enclosure for the microphone. The enclosure is especially constructed such, that the sound waves are allowed to propagate through the enclosure and reach the diaphragm, wherein some directions of propagation are advantageous, such that the directional pattern of such a microphone becomes a pattern between omnidirectional and dipole. Those patterns may, for example, have two lobes. However, the lobes may have different strength. Some commonly known microphones have patterns that have only one single lobe. The most important example is the cardioid pattern, where the directional function D can be expressed as $D=1+\cos(\theta)$, $\theta$ being the direction of arrival of sound. The directional function such quantifies, what fraction of incoming sound amplitude is captured, depending on different direction.

The previously discussed omnidirectional patterns are also called zeroeth-order patterns and the other patterns mentioned previously (dipole and cardioid) are called first-order patterns. All the previously discussed microphone designs do not allow arbitrary shaping of the directivity patterns, since their directivity pattern is entirely determined by the mechanical construction.

To partly overcome the problem, some specialized acoustical structures have been designed, which can be used to create narrower directional patterns than those of first-order microphones. For example, when a tube with holes in it is attached to an omnidirectional microphone, a microphone with narrow directional pattern can be created. These microphones are called shotgun or rifle microphones. However, they typically do not have a flat frequency response, that is, the directivity pattern is narrowed at the cost of the quality of the recorded sound. Furthermore, the directivity pattern is predetermined by the geometric construction and, thus, the directivity pattern of a recording performed with such a microphone cannot be controlled after the recording.

Therefore, other methods have been proposed to partly allow to alter the directivity pattern after the actual recording. Generally, this relies on the basic idea of recording sound with an array of omnidirectional or directional microphones and to apply signal processing afterwards. Various such techniques have been recently proposed. A fairly simple example is to record sound with two omnidirectional microphones, which are placed close to each other, and to subtract both signals from each other. This creates a virtual microphone signal having a directional pattern equivalent to a dipole.

In other, more sophisticated schemes, the microphone signals can also be delayed or filtered before summing them up. Using forming, a signal corresponding to a narrow beam is formed by filtering each microphone signal with a specially designed filter and summing the signals up after the filtering (filter-sum beam forming). However, these techniques are blind to the signal itself, that is, they are not aware of the direction of arrival of the sound. Thus, a predetermined directional pattern may be defined, which is independent of the actual presence of a sound source in the predetermined direction. Generally, estimation of the “direction of arrival” of sound is a task of its own.

Generally, numerous different spatial directional characteristics can be formed with the above techniques. However, forming arbitrary spatially selective sensitivity patterns (i.e. forming narrow directional patterns) involves a large number of microphones.

An alternative way to create multi-channel recordings is to locate a microphone close to each sound source (e.g. an instrument) to be recorded and recreate the spatial impression by controlling the levels of the close-up microphone signals in the final mix. However, such a system demands a large number of microphones and a lot of user-interaction in creating the final down-mix.

A method to overcome the above problem is DirAC, which may be used with different microphone systems and which is able to record sound for reproduction with arbitrary loudspeaker set ups. The purpose of DirAC is to reproduce the spatial impression of an existing acoustical environment as precisely as possible, using a multi-channel loudspeaker system having an arbitrary geometrical set up. Within the recording environment, the responses of the environment (which may be continuous recorded sound or impulse responses) are measured with an omnidirectional microphone (W) and with a set of microphones allowing to measure the direction of arrival of sound and the diffuseness of sound.

In the following paragraphs and within the application, the term “diffuseness” is to be understood as a measure for a non-directivity of sound. That is, sound arriving at the listening or recording position with equal strength from all directions, is maximally diffused. A common way of quantifying diffusion is to use diffuseness values from the interval $[0, \ldots, 1]$, wherein a value of 1 describes maximally diffused sound and a value of 0 describes perfectly directional sound, i.e. sound arriving from one clearly distinguishable direction only. One commonly known method of measuring the direction of arrival of sound is to apply 3 figure-of-eight microphones (X, Y, Z) aligned with Cartesian coordinate axes. Special microphones, so-called “B-Format microphones”, have been designed, which directly yield all desired responses. However, as mentioned above, the W, X, Y and Z signals may also be computed from a set of discrete omnidirectional microphones.

In DirAC analysis, a recorded sound signal is divided into frequency channels, which correspond to the frequency selectivity of human auditory perception. That is, the signal is, for example, processed by a filter bank or a Fourier-transform to divide the signal into numerous frequency channels, having a bandwidth adapted to the frequency selectivity of the human hearing. Then, the frequency band signals are analyzed to determine the direction of origin of sound and a diffuseness value for each frequency channel with a predetermined time resolution. This time resolution does not have be fixed and may, of course, be adapted to the recording environment. In DirAC, one or more audio channels are recorded or transmitted, together with the analyzed direction and diffuseness data.

In synthesis or decoding, the audio channels finally applied to the loudspeakers can be based on the omnidirectional channel W (recorded with a high quality due to the omnidirectional directivity pattern of the microphone used), or the sound for each loudspeaker may be computed as a weighted sum of W, X, Y and Z, thus forming a signal having a certain directional characteristic for each loudspeaker. Corresponding to the encoding, each audio channel is divided into frequency channels, which are optionally further divided into diffuse and non-diffuse streams, depending on analyzed diffuseness. If diffuseness has been measured to be high, a diffuse stream may be reproduced using a technique producing a diffuse perception of sound, such as the decorrelation techniques also used in Binaural Cue Coding.

Non-diffused sound is reproduced using a technique aiming to produce a point-like virtual audio source, located in the direction indicated by the direction data found in the analysis, i.e. the generation of the DirAC signal. That is, spatial reproduction is not tailored to one specific, "ideal" loudspeaker set-up, as in conventional techniques (e.g. 5.1). This is particularly the case, as, the origin of sound is determined as direction parameters (i.e. described by a vector) using the knowledge about the directivity patterns on the microphones used in the recording. As already discussed, the origin of sound in 3-dimensional space is parameterized in a frequency selective manner. As such, the directional impression may be reproduced with high quality for arbitrary loudspeaker set-ups, as far as the geometry of the loudspeaker set-up is known. DirAC is therefore, not limited to special loudspeaker geometries and generally allows for a more flexible spatial reproduction of sound.

DirAC, cf. Pulkki, V., Directional audio coding in spatial sound reproduction and stereo upmixing," In Proceedings of The AES 28$^{th}$ International Conference, pp. 251-258, Piteå, Sweden, Jun. 30-Jul. 2, 2006, provides a system for representing spatial audio signals based on one or more downmix signals plus additional side information. The side information describes, among other possible aspects, the direction of arrival of the sound field in the degree of its diffuseness in a number of frequency bands, as it is shown in FIG. 5.

FIG. 5 exemplifies a DirAC signal, which is composed of three directional components as, for example, figure-of-8 microphone signals X, Y, Z plus an omnidirectional signal W. Each of the signals is available in the frequency domain, which is illustrated in FIG. 5 by multiple stacked planes for each of the signals. Based on the four signals an estimation of a direction and a diffuseness can be carried out in blocks 510 and 520, which exemplify said estimation of the direction and the diffuseness for each of the frequency channels. The result of these estimations are given by the parameters $\theta(t,f)$, $\phi(t,f)$ and $\psi(t,f)$ representing the azimuth angle, the elevation angle and the diffuseness for each of the frequency layers.

The DirAC parameterization can be used to easily implement a spatial filter with a desired spatial characteristic, for example only passing sound from the direction of a particular talker. This can be achieved by applying a direction/diffuseness and optionally frequency dependent weighting to the downmix signals as illustrated in FIGS. 6 and 7.

FIG. 6 shows a decoder 620 for reconstruction of an audio signal. The decoder 620 comprises a direction selector 622 and an audio processor 624. According to the example of FIG. 6 a multi-channel audio input 626 recorded by several microphones is analyzed by a direction analyzer 628 which derives direction parameters indicating a direction of origin of a portion of the audio channels, i.e. the direction of origin of the signal portion analyzed. The direction, from which most of the energy is incident to the microphone is chosen and the recording position is determined for each specific signal portion. This can, for example, be also done using the DirAC-microphone-techniques previously described. Other directional analysis methods based on recorded audio information may be used to implement the analysis. As a result, the direction analyzer 628 derives direction parameters 630, indicating the direction of origin of a portion of an audio channel or of the multi-channel signal 626. Furthermore, the directional analyzer 628 may be operative to derive a diffuseness parameter 632 for each signal portion, for example, for each frequency interval or for each time-frame of the signal.

The direction parameter 630 and, optionally, the diffuseness parameter 632 are transmitted to the direction selector 620, which is implemented to select a desired direction for origin with respect to a recording position or a reconstructed portion of the reconstructed audio signal. Information on the desired direction is transmitted to the audio processor 624. The audio processor 624 receives at least one audio channel 634, having a portion, for which the direction parameters have been derived. The at least one channel modified by audio processor may, for example, be a down-mix of the multi-channel signal 626, generated by conventional multi-channel down-mix algorithms. One extremely simple case would be the direct sum of the signals of the multi-channel audio input 626. However, as the concept is not limited by the number of input channels, all audio input channels 626 can be simultaneously processed by audio decoder 620.

The audio processor 624 modifies the audio portion for deriving the reconstructed portion of the reconstructed audio signal, wherein the modifying comprises increasing an intensity of a portion of the audio channel having direction parameters indicating a direction of origin close to the desired direction of origin with respect to another portion of the audio channel having direction parameters indicating a direction of origin further away from the desired direction of origin. In the example of FIG. 6, the modification is performed by multiplying a scaling factor 636 ($q$) with the portion of the audio channel to be modified. That is, if the portion of the audio channel is analyzed to be originating from a direction close to the selected desired direction, a large scaling factor 636 is multiplied with the audio portion. Thus, at its output 638, the audio processor outputs a reconstructed portion of the reconstructed audio signal corresponding to the portion of the audio channel provided at its input. As furthermore indicated by the dashed lines at the output 638 of the audio processor 624, this may not only be performed for a mono-output signal, but also for multi-channel output signals, for which the number of output channels is not fixed or predetermined.

In other words, the audio decoder 620 takes its input from such directional analysis as, for example, used in DirAC. Audio signals 626 from a microphone array may be divided into frequency bands according to the frequency resolution of the human auditory system. The direction of sound and, optionally, diffuseness of sound is analyzed depending on time at each frequency channel. These attributes are delivered further as, for example, direction angles azimuth (azi) and elevation (ele), and as diffuseness index ($\psi$), which varies between zero and one.

Then, the intended or selected directional characteristic is imposed on the acquired signals by using a weighting operation on them, which depends on the direction angles (azi and ele) and, optionally, on the diffuseness (T). Evidently, this weighting may be specified differently for different frequency bands, and will, in general, vary over time.

FIG. 7 shows a further example based on DirAC synthesis. In that sense, the example of FIG. 7 could be interpreted to be an enhancement of DirAC reproduction, which allows to control the level of the sound depending on analyzed direction. This makes it possible to emphasize sound coming from one or multiple directions, or to suppress sound from one or multiple directions. When applied in multi-channel reproduction, a post-processing of the reproduced sound image is achieved. If only one channel is used as output, the effect is equivalent to the use of a directional microphone with arbitrary directional patterns during recording of the signal. As shown in FIG. 7, the derivation of direction parameters, as well as the derivation of one transmitted audio channel is shown. The analysis is performed based on B-format microphone channels w, X, Y and Z, as, for example, recorded by a sound field microphone.

The processing is performed frame-wise. Therefore, the continuous audio signals are divided into frames, which are scaled by a windowing function to avoid discontinuities at the frame boundaries. The windowed signal frames are subjected to a Fourier transform in a Fourier transform block 740, dividing the microphone signals into N frequency bands. For the sake of simplicity, the processing of one arbitrary frequency band shall be described in the following paragraphs, as the remaining frequency bands are processed equivalently. The Fourier transform block 740 derives coefficients describing the strength of the frequency components present in each of the B-format microphone channels W, X, Y, and Z within the analyzed windowed frame. These frequency parameters 742 are input into audio encoder 744 for deriving an audio channel and associated direction parameters. In the example shown in FIG. 7, the transmitted audio channel is chosen to be the omnidirectional channel 746 having information on the signal from all directions. Based on the coefficients 742 for the omnidirectional and the directional portions of the B-format microphone channels, a directional and diffuseness analysis is performed by a direction analysis block 748.

The direction of origin of sound for the analyzed portion of the audio channel is transmitted to an audio decoder 750 for reconstructing the audio signal together with the omnidirectional channel 746. When diffuseness parameters 752 are present, the signal path is split into a non-diffuse path 754*a* and a diffuse path 754*b*. The non-diffuse path 754*a* is scaled according to the diffuseness parameter, such that, when the diffuseness ψ is low, most of the energy or of the amplitude will remain in the non-diffuse path. Conversely, when the diffuseness is high, most of the energy will be shifted to the diffuse path 754*b*. In the diffuse path 754*b*, the signal is decorrelated or diffused using decorrelators 756*a* or 756*b*. Decorrelation can be performed using conventionally known techniques, such as convolving with a white noise signal, wherein the white noise signal may differ from frequency channel to frequency channel. As long as decorrelation is energy preserving, a final output can be regenerated by simply adding the signals of the non-diffuse signal path 754*a* and the diffuse signal path 754*b* at the output, since the signals at the signal paths have already been scaled, as indicated by the diffuseness parameter ψ.

When the reconstruction is performed for a multi-channel set-up, the direct signal path 754*a* as well as the diffuse signal path 754*b* are split up into a number of sub-paths corresponding to the individual loudspeaker signals at split up positions 758*a* and 758*b*. To this end, the split up at the split up position 758*a* and 758*b* can be interpreted to be equivalent to an up-mixing of the at least one audio channel to multiple channels for a playback via a speaker system having multiple loudspeakers.

Therefore, each of the multiple channels has a channel portion of the audio channel 746. The direction of origin of individual audio portions is reconstructed by redirection block 760 which additionally increases or decreases the intensity or the amplitude of the channel portions corresponding to the loudspeakers used for playback. To this end, redirection block 760 generally relies on knowledge about the loudspeaker setup used for playback. The actual redistribution (redirection) and the derivation of the associated weighting factors can, for example, be implemented using techniques using as vector based amplitude panning. By supplying different geometric loudspeaker setups to the redistribution block 760, arbitrary configurations of playback loudspeakers can be used in embodiments, without a loss of reproduction quality. After the processing, multiple inverse Fourier transforms are performed on frequency domain signals by inverse Fourier transform blocks 762 to derive a time domain signal, which can be played back by the individual loudspeakers. Prior to the playback, an overlap and add technique is performed by summation units 764 to concatenate the individual audio frames to derive continuous time domain signals, ready to be played back by the loudspeakers.

According to the example shown in FIG. 7, the signal processing of DirAC is amended in that an audio processor 766 is introduced to modify the portion of the audio channel actually processed and which allows to increase an intensity of a portion of the audio channel having direction parameters indicating a direction of origin close to a desired direction. This is achieved by application of an additional weighting factor to the direct signal path. That is, if the frequency portion processed originates from the desired direction, the signal is emphasized by applying an additional gain to that specific signal portion. The application of the gain can be performed prior to the split point 758*a*, as the effect shall contribute to all channel portions equally.

The application of the additional weighting factor can be implemented within the redistribution block 760 which, in that case, applies redistribution gain factors increased by the additional weighting factor.

When using directional enhancement in reconstruction of a multi-channel signal, reproduction can, for example, be performed in the style of DirAC rendering, as shown in FIG. 7. The audio channel to be reproduced is divided into frequency bands equal to those used for the directional analysis. These frequency bands are then divided into streams, a diffuse and a non-diffuse stream. The diffuse stream is reproduced, for example, by applying the sound to each loudspeaker after convolution with 30 ms white noise bursts. The noise bursts are different for each loudspeaker. The non-diffuse stream is applied to the direction delivered from the directional analysis which is, of course, dependent on time. To achieve a directional perception in multi-channel loudspeaker systems, simple pair-wise or triplet-wise amplitude panning may be used. Furthermore, each frequency channel is multiplied by a gain factor or scaling factor, which depends on the analyzed direction. In general terms, a function can be specified, defining a desired directional pattern for reproduction. This can, for example, be only one single direction, which shall be emphasized. However, arbitrary directional patterns can be easily implemented in line with FIG. 7.

In the following approach, a further example is described as a list of processing steps. The list is based on the assumption that sound is recorded with a B-format microphone, and is then processed for listening with multi-channel or monophonic loudspeaker set-ups using DirAC style rendering or rendering supplying directional parameters, indicating the direction of origin of portions of the audio channel.

First, microphone signals can be divided into frequency bands and be analyzed in direction and, optionally, diffuseness at each band depending on frequency. As an example, direction may be parameterized by an azimuth and an elevation angle (azi, ele). Second, a function F can be specified, which describes the desired directional pattern. The function may have an arbitrary shape. It typically depends on direction. It may, furthermore, also depend on diffuseness, if diffuseness information is available. The function can be different for different frequencies and it may also be altered depending on time. At each frequency band, a directional factor q from the function F can be derived for each time instance, which is used for subsequent weighting (scaling) of the audio signal.

Third, the audio sample values can be multiplied with the q values of the directional factors corresponding to each time and frequency portion to form the output signal. This may be done in a time and/or a frequency domain representation. Furthermore, this processing may, for example, be implemented as a part of a DirAC rendering to any number of desired output channels.

As previously described, the result can be listened to using a multi-channel or a monophonic loudspeaker system. Recently, parametric techniques for the bitrate-efficient transmission/storage of audio scenes containing multiple audio objects have been proposed, e.g. Binaural Cue Coding (Type 1), cf. C. Faller and F. Baumgarte, "Binaural Cue Coding—Part II: Schemes and applications", IEEF Trans. on Speech and Audio Proc., vol. 11, no. 6, November 2003, or Joint Source Coding, cf. C. Faller, "Parametric Joint-Coding of Audio Sources", 120$^{th}$ AES Convention, Paris, 2006, Preprint 6752, and MPEG Spatial Audio Object Coding (SAOC), cf. J. Herre, S. Disch, J. Hilpert, O. Hellmuth: "From SAC to SAOC—Recent Developments in Parametric Coding of Spatial Audio", 22$^{nd}$ Regional UK AES Conference, Cambridge, UK, April 2007, J. Engdegård, B. Resch, C. Falch, O. Hellmuth, J. Hilpert, A. Hölzer, L. Terentiev, J. Breebaart, J. Koppens, E. Schuijers and W. Oomen: "Spatial Audio Object Coding (SAOC)—The Upcoming MPEG Standard on Parametric Object Based Audio Coding", 124$^{th}$ AES Convention, Amsterdam 2008, Preprint 7377).

These techniques aim at perceptually reconstructing the desired output audio scene rather than by a waveform match. FIG. 8 shows a system overview of such a system (here: MPEG SAOC). FIG. 8 shows an MPEG SAOC system overview. The system comprises an SAOC encoder 810, an SAOC decoder 820 and a renderer 830. The general processing can be carried out in a frequency selective way, where the processing defined in the following can be carried out in each of the individual frequency bands. The SAOC encoder is input with a number of (N) input audio object signals, which are downmixed as part of the SAOC encoder processing. The SAOC encoder 810 outputs the downmix signal and side information. The side information extracted by the SAOC encoder 810 represents the characteristics of the input audio objects. For MPEG SAOC, the object powered for all audio objects are the most significant components of the side information. In practice, instead of absolute object powers, relative powers, called object level differences (OLD), are transmitted. The coherence/correlation between pairs of objects are called interobject coherence (IOC) and can be used to describe the properties of the input audio objects further.

The downmix signal and the side information can be transmitted or stored. To this end, the downmix audio signal may be compressed using well-known perceptual audio coders, such as MPEG-1 layer 2 or 3, also known as MP3, MPEG advance audio coding (AAC) etc.

On the receiving end, the SAOC decoder 820 conceptually tries to restore the original object signals, to which it is also referred to as object separation, using the transmitted side information. These approximated object signals are then mixed into a target scene represented by M audio output channels using a rendering matrix, being applied by the renderer 830. Effectively, the separation of the object signals is never executed since both the separation step and the mixing step are combined into a single transcoding step, which results in an enormous reduction in computational complexity.

Such a scheme can be very efficient, both in terms of transmission bitrate, it only needs to transmit a few downmix channels plus some side information instead of N object audio signals plus rendering information or a discrete system, and computational complexity, the processing complexity relates mainly to the number of output channels rather than the number of audio objects. Further advantages for the user on the receiving end include the freedom of choosing a rendering setup of his/her choice, e.g. mono, stereo, surround, virtualized headphone playback etc. and the feature of user interactivity: The rendering matrix, and thus the output scene, can be set and changed interactively by the user according to will, personal preference or other criteria, e.g. locate the talkers from one group together in one spatial area to maximize discrimination from other remaining talkers. This interactivity is achieved by providing a decoder user interface.

A conventional transcoding concept for transcoding SAOC into MPEG surround (MPS) for multi channel rendering is considered in the following. Generally, the decoding of SAOC can be done by using a transcoding process. MPEG SAOC renders the target audio scene, which is composed of all single audio objects, to a multi-channel sound reproduction setup by transcoding it into the related MPEG surround format, cf. J. Herre, K. Kjörling, J. Breebaart, C. Faller, S. Disch, H. Purnhagen, J. Koppens, J. Hilpert, J. Rödén, W. Oomen, K. Linzmeier, K. S. Chong: "MPEG Surround—The ISO/MPEG Standard for Efficient and Compatible Multichannel Audio Coding", 122$^{nd}$ AES Convention, Vienna, Austria, 2007, Preprint 7084.

According to FIG. 9, the SAOC side information is parsed 910 and then transcoded 920 together with user supplied data about the playback configuration and object rendering parameters. Additionally, the SAOC downmix parameters are conditioned by a downmix preprocessor 930. Both the processed downmix and the MPS side information can then be passed to the MPS decoder 940 for final rendering.

Conventional concepts have the disadvantage that they are either easy to implement as, for example, for the case of DirAC, but user information or user individual rendering cannot be applied, or they are more complex to implement, however, provide the advantage that user information can be considered as, for example, for SAOC.

SUMMARY

According to an embodiment, an audio format transcoder fdr transcoding an input audio signal, the input audio signal having at least two directional audio components, may have: a converter for converting the input audio signal into a converted signal, the converted signal having a converted signal representation and a converted signal direction of arrival; a position provider for providing at least two spatial positions of at least two spatial audio sources; and a processor for processing the converted signal representation based on the at least two spatial positions and the converted signal direction of arrival to acquire at least two separated audio source measures, wherein the processor is adapted for determining a weighting factor for each of the at least two separated audio sources, and wherein the processor is adapted for processing the converted signal representation in terms of at least two spatial filters depending on the weighting factors for approximating at least two isolated audio sources with at least two separated audio source signals as the at least two separated audio source measures, or wherein the processor is adapted for estimating a power information for each of the at least two separated audio sources depending on the weighting factors as the at least two separated audio source measures.

According to another embodiment, a method for transcoding an input audio signal, the input audio signal having at least two directional audio components, may have the steps of: converting the input audio signal into a converted signal, the converted signal having a converted signal representation and the converted signal direction of arrival; providing at least two spatial positions of the at least two spatial audio sources; and processing the converted signal representation based on the at least two spatial positions to acquire the at least two separated audio source measures, wherein said processing includes determining a weighting factor for each of the at least two separated audio sources, and processing the converted signal representation using at least two spatial filters depending on the weighting factors for approximating at least two isolated audio sources with at least two separated audio source signals as the at least two separated audio source measures, or estimating a power information for each of the at least two separated audio sources depending on the weighting factors as the at least two separated audio source measures.

Another embodiment may have a computer program for performing the method for transcoding an input audio signal, the input audio signal having at least two directional audio components, which method may have the steps of: converting the input audio signal into a converted signal, the converted signal having a converted signal representation and the converted signal direction of arrival; providing at least two spatial positions of the at least two spatial audio sources; and processing the converted signal representation based on the at least two spatial positions to acquire the at least two separated audio source measures, wherein said processing includes determining a weighting factor for each of the at least two separated audio sources, and processing the converted signal representation using at least two spatial filters depending on the weighting factors for approximating at least two isolated audio sources with at least two separated audio source signals as the at least two separated audio source measures, or estimating a power information for each of the at least two separated audio sources depending on the weighting factors as the at least two separated audio source measures, when the computer program runs on a computer or a processor.

It is a finding of the present invention that the capabilities of directional audio coding and spatial audio object coding can be combined. It is also a finding of the present invention that directional audio components can be converted into separated audio source measures or signals. Embodiments may provide means to efficiently combine the capabilities of the DirAC and the SAOC system, thus, creating a method that uses DirAC as an acoustic front end with its built-in spatial filtering capability and uses this system to separate the incoming audio into audio objects, which are then represented and rendered using SAOC. Furthermore, embodiments may provide the advantage that the conversion from a DirAC representation into an SAOC representation may be performed in an extremely efficient way by converting the two types of side information and, advantageously in some embodiments, leaving the downmix signal untouched.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
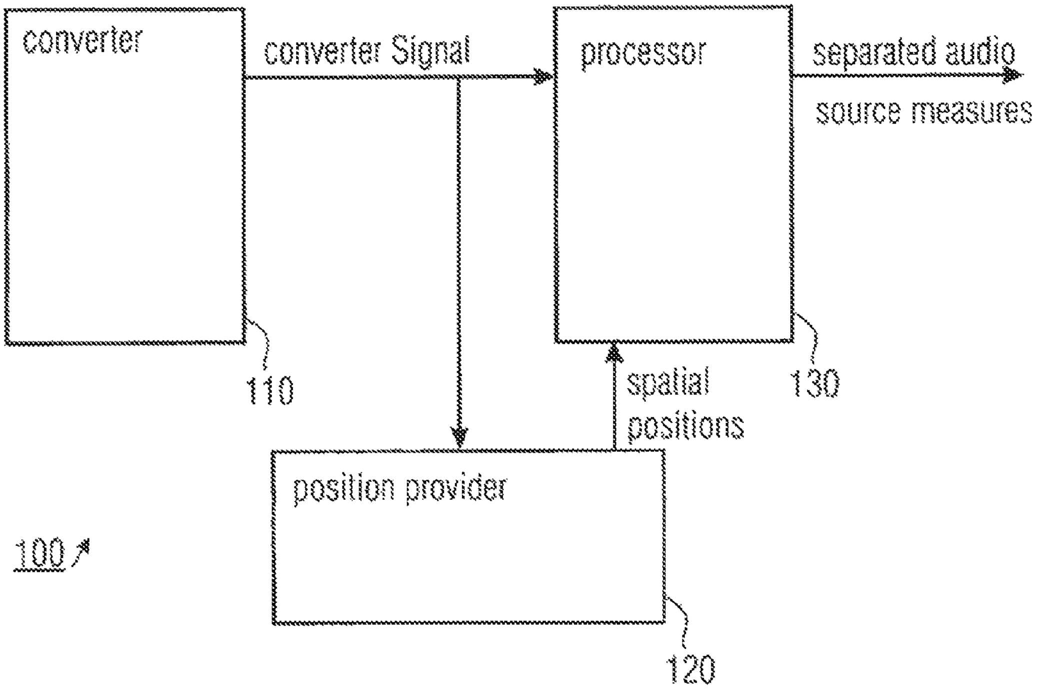
FIG. 1 shows an embodiment of an audio format transcoder.

FIG. 1 shows an audio format transcoder 100 for transcoding an input audio signal, the input audio signal having at least two directional audio components. The audio format transcoder 100 comprises a converter 110 for converting the input signal into a converted signal, the converted signal having a converted signal representation and a converted signal direction of arrival. Furthermore, the audio format transcoder 100 comprises a position provider 120 for providing at least two spatial positions of at least two spatial audio sources. The at least two spatial positions may be known a-priori, i.e. for example given or entered by a user, or determined or detected based on the converted signal. Moreover, the audio format transcoder 100 comprises a processor 130 for processing converted signal representation based on the at least two spatial positions to obtain at least two separated audio source measures.

Figure 2:
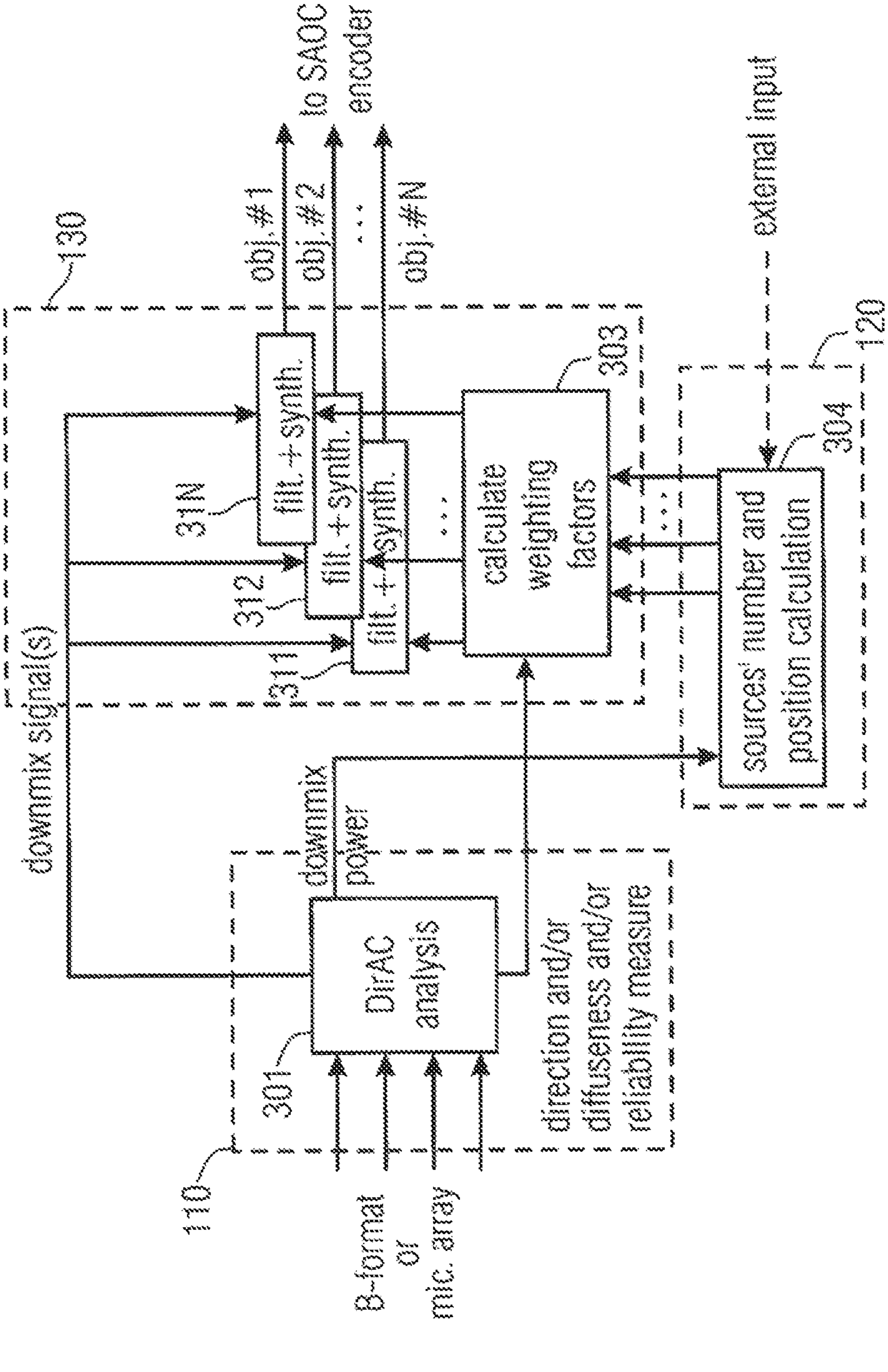
FIG. 2 shows another embodiment of an audio format transcoder.

Embodiments may provide means to efficiently combine the capabilities of the DirAC and the SAOC systems. Another embodiment of the present invention is depicted in FIG. 2. FIG. 2 shows another audio format transcoder 100, wherein the converter 110 is implemented as a DirAC analysis stage 301. In embodiments, the audio format transcoder 100 can be adapted for transcoding an input signal according to a DirAC signal, a B-format signal or a signal from a microphone array. According to the embodiment depicted in FIG. 2, DirAC can be used as an acoustic front-end to acquire a spatial audio scene using a B-format microphone or, alternatively, a microphone array, as shown by the DirAC analysis stage or block 301.

As already mentioned above, in embodiments, the audio format transcoder 100, the converter 110, the position provider 120 and/or the processor 130 can be adapted for converting the input signal in terms of a number of frequency subbands and/or time segments or time frames.

In embodiments, the converter 110 can be adapted for converting the input signal to the converted signal further comprising a diffuseness and/or a reliability measure per frequency subband.

In FIG. 2, the converted signal representation is also labeled "Downmix Signals". In the embodiment depicted in FIG. 2, the underlying DirAC parametrization of the acoustic signal into direction and, optionally, diffuseness and reliability measure within each frequency subband can be used by the position provider 120, i.e. the "sources number and position calculation"—block 304 to detect the spatial positions at which audio sources are active. According to the dashed line labeled "Downmix Power" in FIG. 2, the downmix powers may be provided to the position provider 120.

In the embodiment depicted in FIG. 2, the processor 130 may use the spatial positions, optionally other a-priori knowledge, to implement a set of spatial filters 311, 312, 31N for which weighting factors are calculated in block 303 in order to isolate or separate each audio source.

In other words, in embodiments, the processor 130 can be adapted for determining a weighting factor for each of the at least two separated audio sources. Moreover, in embodiments, the processor 130 can be adapted for processing the converted signal representation in terms of at least two spatial filters for approximating at least two isolated audio sources with at least two separated audio source signals as the at least two separated audio source measures. The audio source measure may for example correspond to respective signals or signal powers.

In the embodiment depicted in FIG. 2, the at least two audio sources are represented more generally by N audio sources and the corresponding signals. Accordingly, in FIG. 2, N filters or synthesis stages are shown, i.e. 311, 312, . . . , 31N. In these N spatial filters, the DirAC downmix, i.e. the omnidirectional components, signals result in a set of approximated separated audio sources, which can be used as an input to an SAOC encoder. In other words, in embodiments, the separated audio sources can be interpreted as distinct audio objects and subsequently encoded in an SAOC encoder. Accordingly, embodiments of the audio format transcoder 100 may comprise an SAOC encoder for encoding the at least two separated audio source signals to obtain an SAOC encoded signal comprising an SAOC downmix component and an SAOC side information component.

The above-described embodiments may carry out a discrete sequence of DirAC directional filtering and subsequent SAOC encoding, for which, in the following, a structural improvement will be introduced, leading to a reduction in computational complexity. As explained above, generally, N-separated audio source signals may be reconstructed in embodiments using N-DirAC synthesis filterbanks, 311 to 31N, and then subsequently be analyzed using SAOC analysis filterbanks in the SAOC encoder. The SAOC encoder may then compute a sum/downmix signal again from the separated object signals. Moreover, processing of the actual signal samples may be computationally more complex than carrying out calculations in the parameter domain, which may happen at a much lower sampling rate and which will be established in further embodiments.

Embodiments may therewith provide the advantage of extremely efficient processing. Embodiments may comprise the following two simplifications. First, both DirAC and SAOC can be run using filterbanks that allow essentially identical frequency subbands for both schemes in some embodiments. Advantageously, in some embodiments, one and the same filterbank is used for both schemes. In this case, DirAC synthesis and SAOC analysis filterbanks can be avoided, resulting in reduced computational complexity and algorithmic delay. Alternatively, embodiments may use two different filterbanks, which deliver parameters on a comparable frequency subband grid. The savings in filterbank computations of such embodiments may not be as high.

Second, in embodiments, rather than explicitly computing the separated source signals, the effect of the separation may be achieved by parameter domain calculations only. In other words, in embodiments, the processor 130 can be adapted for estimating a power information, e.g. a power or normalized power, for each of the at least two separated audio sources as the at least two separated audio source measures. In embodiments, the DirAC downmix power can be computed.

In embodiments, for each desired/detected audio source position, the directional weighting/filtering weight can be determined dependent on direction and possibly diffuseness and intended separation characteristics. In embodiments, the power for each audio source of the separated signals can be estimated from the product of the downmix power and the power weighting factor. In embodiments, the processor 130 can be adapted for converting the powers of the at least two separated audio sources to SAOC OLDs.

Embodiments may carry out the above-described streamlined processing method without involving any processing of the actual downmix signals anymore. Additionally, in some embodiments, the Inter-Object Coherences (IOC) may also be computed. This may be achieved by considering the directional weighting and the downmix signals still in the transformed domain.

In embodiments, the processor 130 can be adapted for computing the IOC for the at least two separated audio sources. Generally, the processor (130) can be adapted for computing the IOC for two of each of the at least two separated audio sources. In embodiments the position provider 120 may comprise a detector being adapted for detecting the at least two spatial positions of at the least two spatial audio sources based on the converted signal. Moreover, the position provider/detector 120 can be adapted for detecting the at least two spatial positions by a combination of multiple subsequent input signal time segments. The position provider/detector 120 can also be adapted for detecting the at least two spatial positions based on a maximum likelihood estimation on the power spatial density. The position provider/detector 120 can be adapted for detecting a multiplicity of positions of spatial audio sources based on the converted signal.

Figure 3:
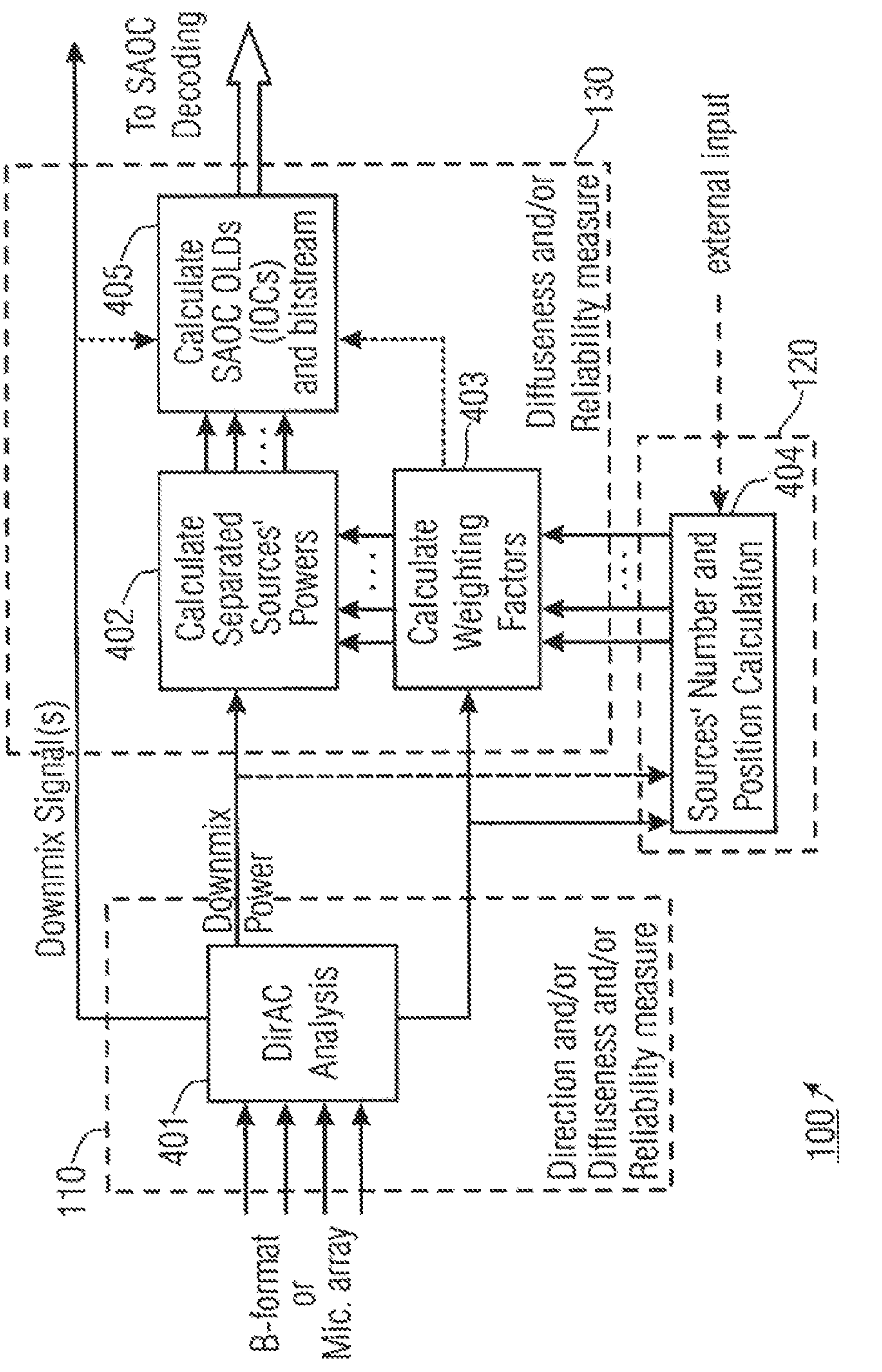
FIG. 3 shows yet another embodiment of an audio format transcoder.

FIG. 3 illustrates another embodiment of an audio format transcoder 100. Similar to the embodiment depicted in FIG. 2, the converter 110 is implemented as a "DirAC analysis"—stage 401. Furthermore, the position provider/detector 120 is implemented as the "sources number and position calculation"—stage 404. The processor 130 comprises the "weighting factor calculation"—stage 403, a stage for calculating separated sources powers 402 and a stage 405 for calculating SAOC OLDs and the bitstream.

Again, in the embodiment depicted in FIG. 3, the signal is acquired using an array of microphones or, alternatively, a B-format microphone and is fed into the "DirAC analysis"—stage 401. This analysis delivers one or more downmix signals and frequency subband information for each processing timeframe including estimates of the instantaneous downmix power and direction. Additionally, the "DirAC analysis"—stage 401 may provide a diffuseness measure and/or a measure of the reliability of the direction estimates. From this information and possibly other data such as the instantaneous downmix power, estimates of the number of audio sources and their position can be calculated by the position provider/detector 120, the stage 404, respectively, for example, by combining measurements from several processing timeframes that are subsequent in time.

The processor 130 may be adapted to derive a directional weighting factor for each audio source and its position in stage 403 from the estimated source position and the direction and, optionally, the diffuseness and/or reliability values of the processed timeframe. By first combining the downmix power estimates and the weighting factors in 402, SAOC OLDs may be derived in 405. Also, a complete SAOC bitstream may be generated in embodiments. Additionally, the processor 130 may be adapted for computing the SAOC IOCs by considering the downmix signal and utilizing the processing block 405 in the embodiment depicted in FIG. 3. In embodiments, the downmix signals and the SAOC side information may then be stored or transmitted together for SAOC decoding or rendering.

The "diffuseness measure" is a parameter, which describes for each time-frequency bin, how "diffuse" the sound field is. Without loss of generality, it is defined in the range [0, 1] where diffuseness=0 indicates a perfectly coherent sound field, e.g., an ideal plane wave, whereas diffuseness=1 indicates a fully diffuse sound field, e.g., the one obtained with a large number of spatially spread audio sources emitting mutually uncorrelated noise. Several mathematical expressions can be employed as a diffuseness measure. For instance, in Pulkki, V., "Directional audio coding in spatial sound reproduction and stereo upmixing," in Proceedings of the AES $28^{th}$ International Conference, pp. 251-258, PiteA, Sweden, Jun. 30-Jul. 2, 2006, diffuseness is computed by means of an energetic analysis on the input signals, comparing the active intensity to the sound field energy.

In the following, the reliability measure will be illuminated. Depending on the direction of arrival estimator used, it is possible to derive a metric, which expresses how reliable each direction estimate is in each time-frequency bin. This information can be exploited in both, the determination of the number and position of sources as well as in the calculation of the weighting factors, in stages 403 and 404, respectively.

In the following, embodiments of the processor 130, i.e. also the "sources number and the position calculation"—stage 404 will be detailed. The number and position of the audio sources for each time frame can either be a-priori knowledge, i.e. an external input, or estimated automatically. For the latter case, several approaches are possible. For instance, a Maximum Likelihood estimator on the power spatial density may be used in embodiments. The latter may compute the power density of the input signal with respect to direction. By assuming that sound sources exhibit a von Mises distribution, it is possible to estimate how many sources exist and where they are located by choosing the solution with highest probability. An exemplary power spatial distribution is depicted in FIG. 4*a*.

Figure 4A:
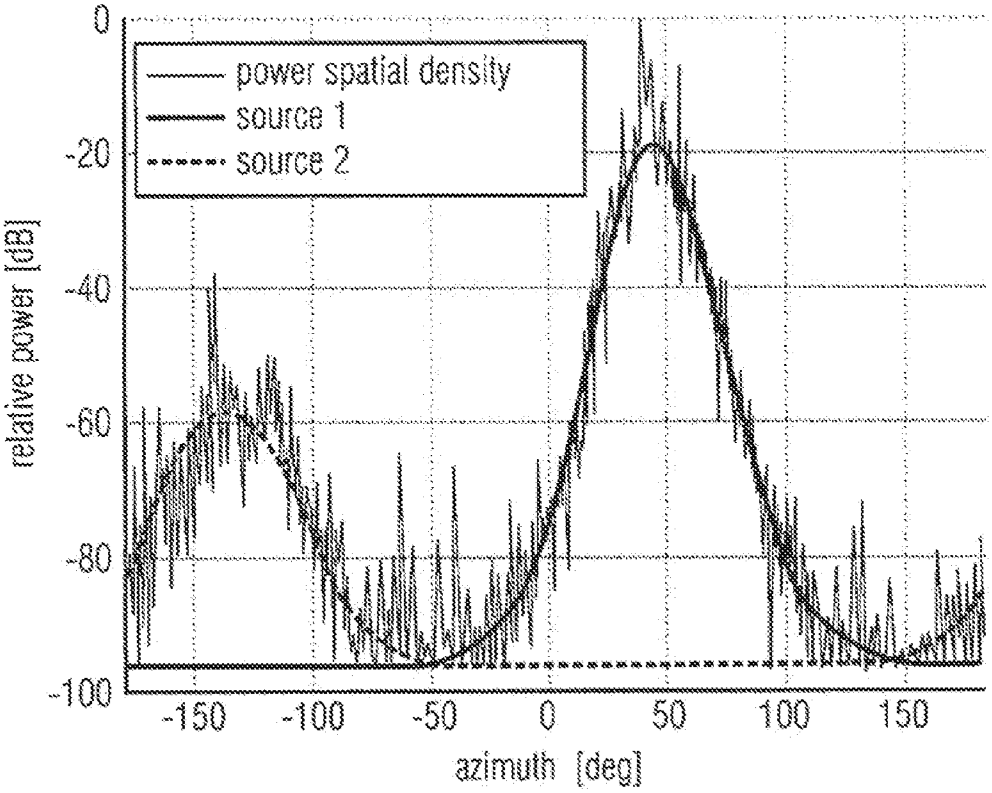
FIG. 4*a* shows a superposition of directional audio components.

FIG. 4*a* depicts a view graph of a power spatial density, exemplified by two audio sources. FIG. 4*a* shows the relative power in dB on the ordinate and the azimuth angle on the abscissa. Moreover, FIG. 4*a* depicts three different signals, one represents the actual power spatial density, which is characterized by a thin line and by being noisy. In addition, the thick line illustrates the theoretical power spatial density of a first source and the dotted line illustrates same for a second source. The model that best fits the observation comprises of two audio sources located at +45° and −135°, respectively. In other models, the elevation may also be available. In such embodiments, the power spatial density becomes a three-dimensional function.

In the following, more details on an implementation of a further embodiment of the processor 130 are provided, especially on the weight calculating stage 403. This processing block computes the weights for each object to be extracted. The weights are computed on the basis of the data provided by the DirAC analysis in 401 together with the information on the number of sources and their position from 404. The information can be processed jointly for all sources or separately, such that the weights for each object are computed independently from the others.

The weights for the i-th objects are defined for each time and frequency bin, so that if $\gamma_i(k,n)$ denotes the weight for the frequency index k and time index n, the complex spectrum of the downmix signal for the i-th object can be computed simply by $$W_i(k,n)=W(k,n)\times\gamma_i(k,n).$$

As already mentioned, the signals obtained in such a way could be sent to an SAOC encoder. However, the embodiments may totally avoid this step by computing the SAOC parameters from the weights $\gamma_i(k,n)$ directly.

In the following it will be briefly explained how the weights $\gamma_i(k,n)$ can be computed in embodiments. If not specified otherwise, all quantities in the following depend on (k,n), namely the frequency and time indices.

It can be assumed that the diffuseness $\Psi$, or the reliability measure, is defined in the range [0, 1], where $\Psi=1$ corresponds to a totally diffuse signal. Furthermore, $\theta$ denotes the direction of arrival, in the following example it denotes the azimuth angle. An extension to 3D space is straightforward.

Moreover, $\gamma_i$ denotes the weight with which the downmix signal is scaled to extract the audio signal of the i-th object, W(k,n) denotes the complex spectrum of the downmix signal and $W_i(k,n)$ denotes the complex spectrum of the i-th extracted object.

In a first embodiment a two-dimensional function in the ($\theta$, $\Psi$) domain is defined. A simple embodiment utilizes a 2D Gaussian function $g(\theta, \Psi)$, according to $$g(\theta,\Psi)=Ae^{-\left(\frac{(\theta-\alpha)^2}{2\sigma\theta^2}+\frac{(\Psi)^2}{2\sigma\Psi^2}\right)},$$

where $\alpha$ is the direction where the object is located, and $\sigma^2_\theta$ and $\sigma^2_\Psi$ are parameters which determine the width of the Gaussian function, i.e. its variances with respect to both dimensions. A is an amplitude factor which can be assumed to equal 1 in the following.

The weight $\gamma_i(k,n)$ can be determined by computing the above equation for the values of $\theta(k,n)$ and $\Psi(k,n)$ obtained from the DirAC processing, i.e.

$$\gamma_i(k,n)=g(\theta(k,n),\Psi(k,n)).$$

Figure 4B:
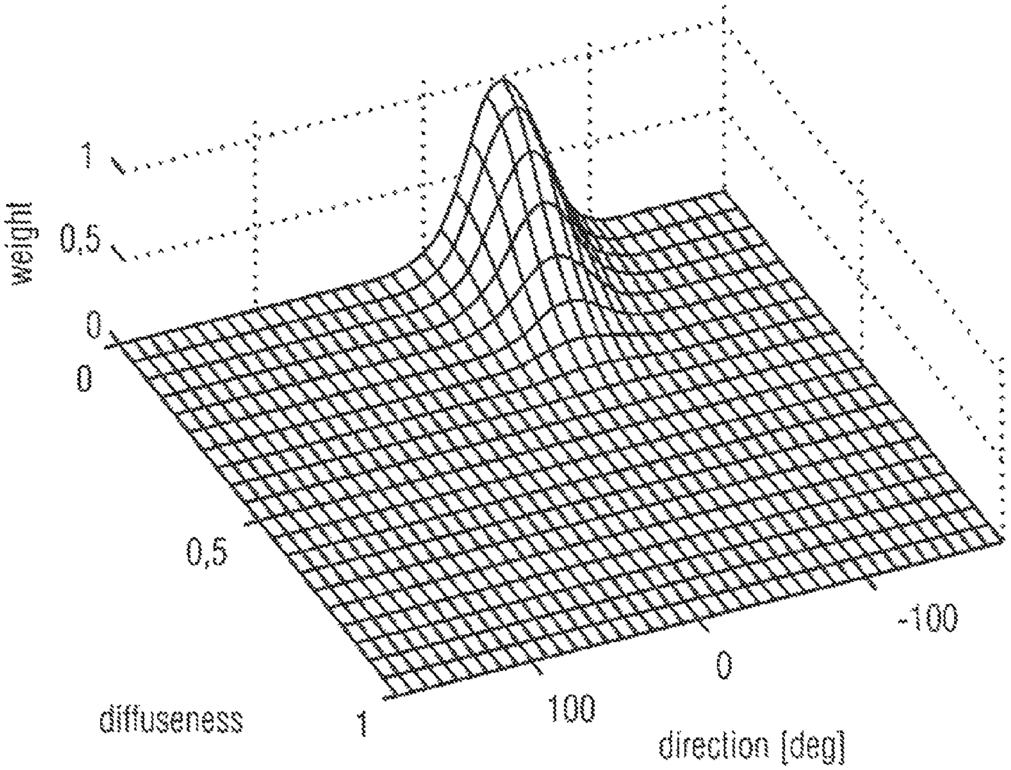
FIG. 4*b* illustrates an exemplary weight function used in an embodiment.

An exemplary function is shown in FIG. 4*b*. In FIG. 4*b* it can be seen that significant weights occur for low diffuseness values. For FIG. 4*b*, $\alpha=-\pi/4$ rad (or −45 deg), $\sigma^2_\theta=0.25$ and $\sigma^2_\Psi=0.2$ have been assumed.

The weight is largest for $\Psi(k,n)=0$ and $\theta=\alpha$. For directions farther away from $\alpha$ as well as for a higher diffuseness the weight decreases. By changing the parameters of $g(\theta(k,n), \Psi(k,n))$ several functions $g(\theta(k,n), \Psi(k,n))$ can be designed, which extract objects from different directions.

If the weights obtained from different objects lead to a total energy, which is larger than the one present in the downmix signal, that is, if $$\sum_{i=1}^{N}\gamma_i^2>1$$

then it is possible to act on the multiplying factors A in the function $g(\theta(k,n), \Psi(k,n))$ to force that the sum of the squares equals or is less than 1.

In a second embodiment weighting for the diffuse and non-diffuse part of the audio signal can be carried out with different weighting windows. More details can be found in Markus Kallinger, Giovanni Del Galdo, Fabian Kuech, Dirk Mahne, Richard Schultz-Amling, "SPATIAL FILTERING USING DIRECTIONAL AUDIO CODING PARAMETERS", ICASSP 09.

Figure 4C:
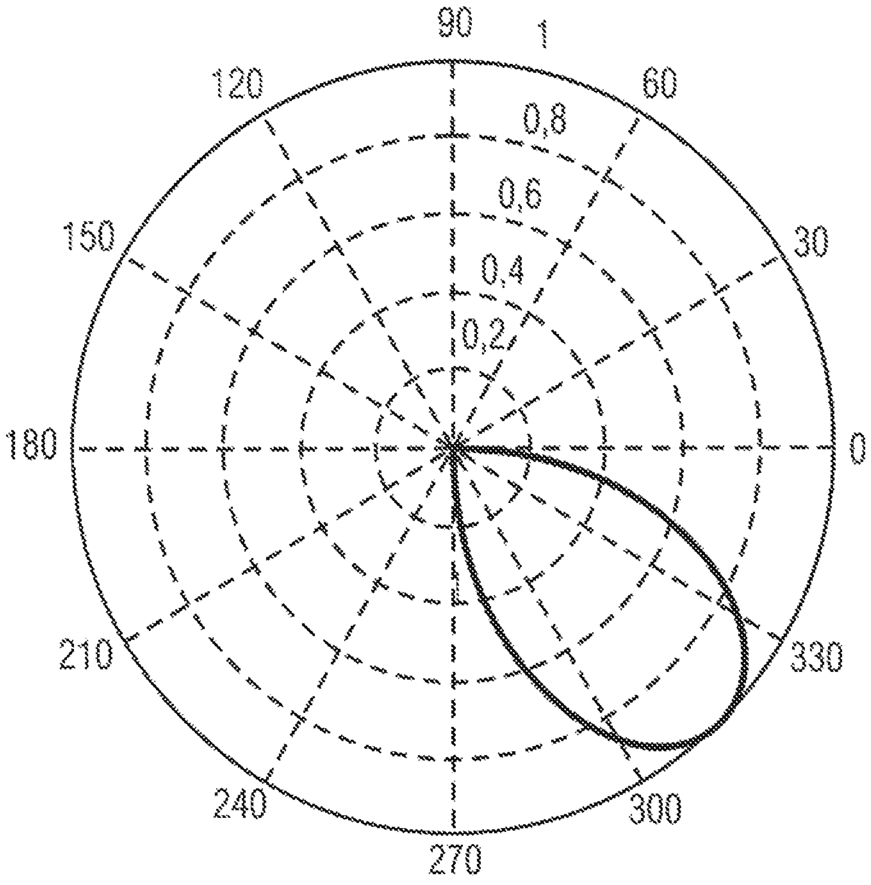
FIG. 4*c* illustrates an exemplary window function used in an embodiment.
Figure 5:
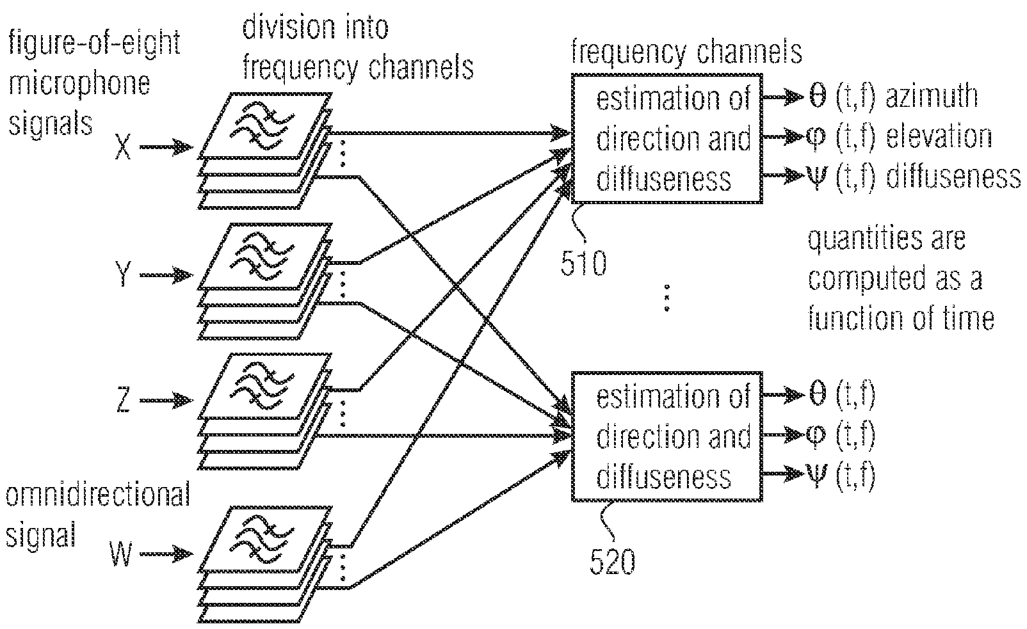
FIG 5 (PRIOR ART)
FIG. 5 illustrates state of the art DirAC.
Figure 6:
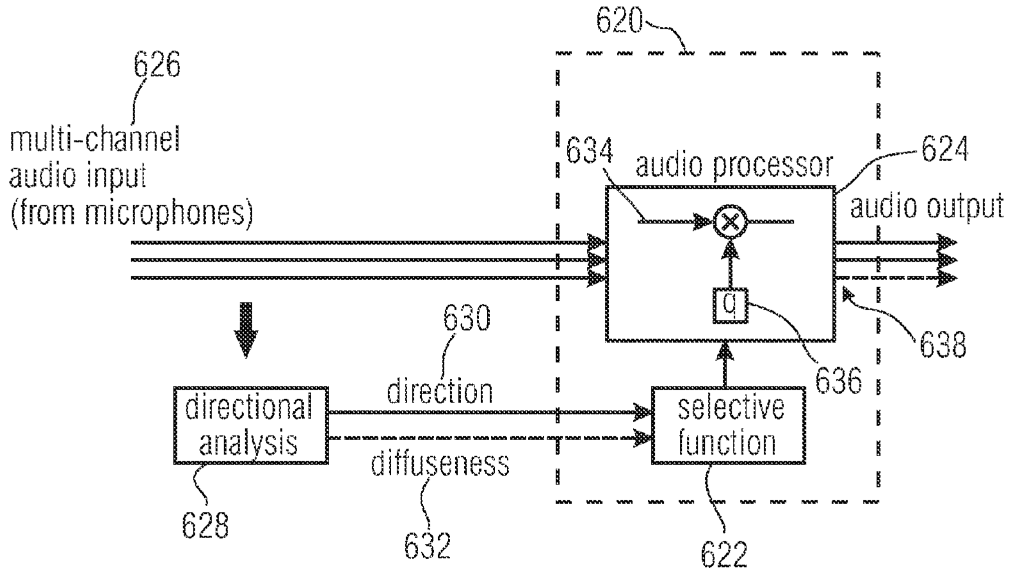
FIG 6 (PRIOR ART)
FIG. 6 illustrates state of the art directional analysis.
Figure 7:
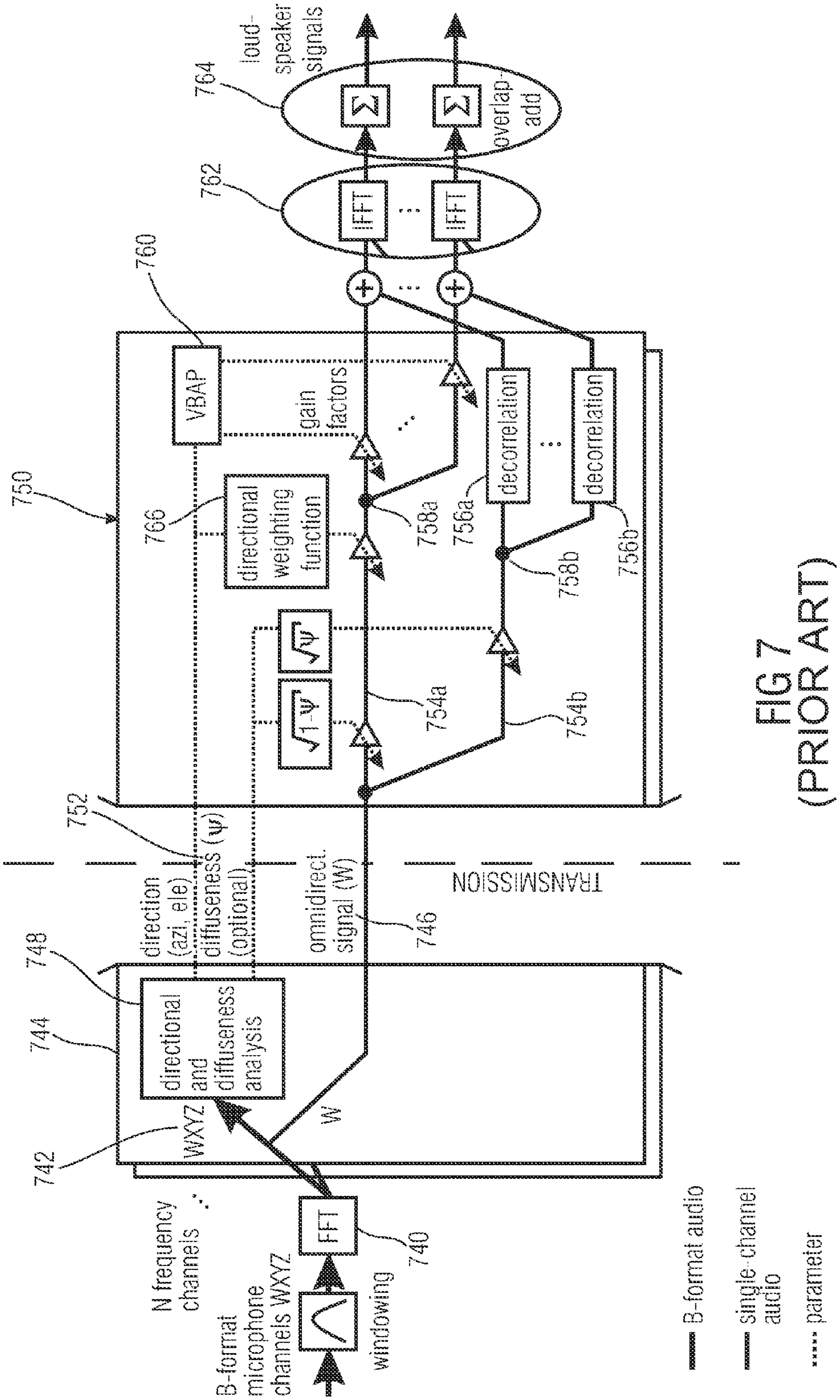
FIG 7 (PRIOR ART)
FIG. 7 illustrates state of the art directional weighting combined with DirAC rendering.
Figure 8:
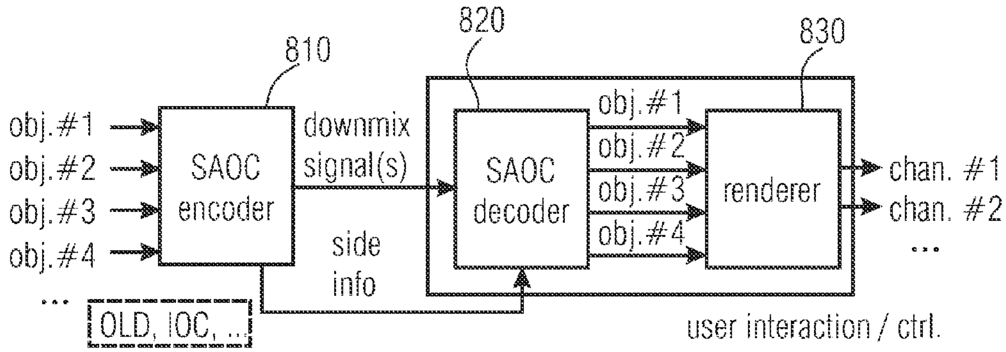
FIG 8 (PRIOR ART)
FIG. 8 shows an MPEG SAOC system overview.
Figure 9:
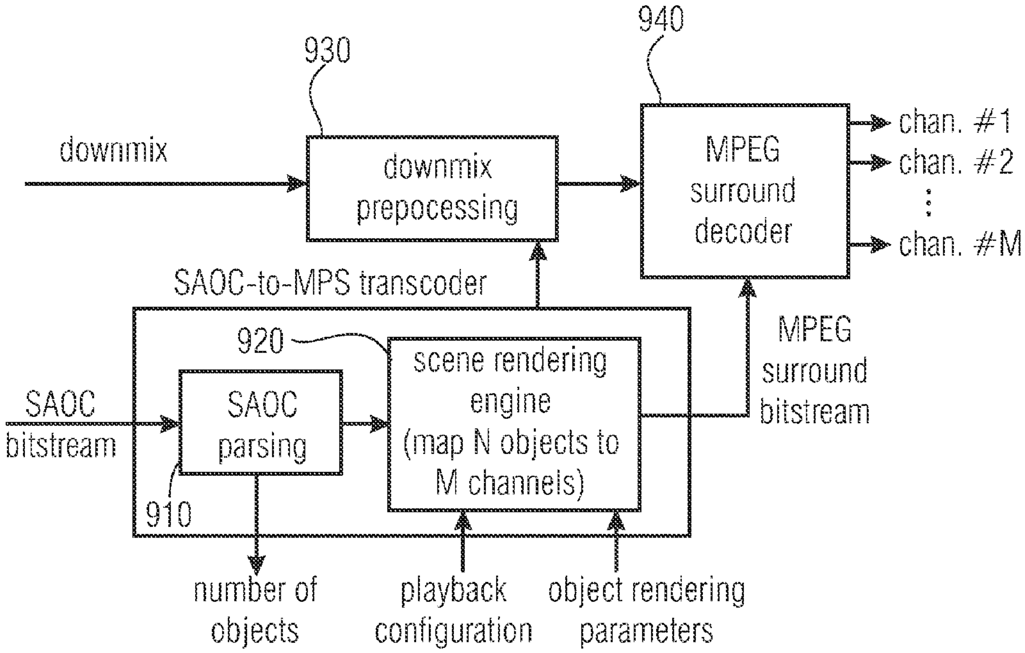
FIG 9 (PRIOR ART)
FIG. 9 illustrates a state of the art transcoding of SAOC into MPS.

The spectrum of the i-th object can be obtained by $$W_i=\gamma_{i,di}\sqrt{\Psi}\cdot W+\gamma_{i,co}\sqrt{1-\Psi}\cdot W,$$

where $\gamma_{i,th}$ and $\gamma_{i,co}$ are the weights for the diffuse and non-diffuse (coherent) part, respectively. The gain for the non-diffuse part can be obtained from a one dimensional window such as the following $$g(\theta)=\sqrt{0.5\cdot\left(1+\cos\left(\frac{\pi\cdot(\theta-\alpha)}{B/2}\right)\right)} \quad \text{for } \alpha-B/2\le\theta\le\alpha+B/2$$
$$=0 \quad \text{otherwise}$$

where B is the width of the window. An exemplary window for $\alpha=-\pi 4, B=\pi/4$ is depicted in FIG. 4*c*.

The gain for the diffuse part, $\gamma_{i,di}$, can be obtained in a similar fashion. Appropriate windows are for instance, cardioids, subcardioids directed towards α, or simply an omnidirectional pattern. Once the gains $\gamma_{i,di}$ and $\gamma_{i,co}$ are computed, the weight $\gamma_i$ can be simply obtained as $$\gamma_i=\gamma_{i,di}\sqrt{\Psi}+\gamma_{i,co}\sqrt{1-\Psi}$$

so that $$W_i=\gamma_i\cdot W.$$

If the weights obtained from different objects lead to a total energy, which is larger than the one present in the downmix signal, that is, if $$\sum_{i=1}^{N}\gamma_i^2>1,$$

then it is possible to rescale the gains y, accordingly. This processing block may also provide the weights for an additional background (residual) object, for which the power is then calculated in block 402. The background object contains the remaining energy which has not been assigned to any other object. Energy can be assigned to the background object also to reflect the uncertainty of the direction estimates. For instance, the direction of arrival for a certain time frequency bin is estimated to be exactly directed towards a certain object. However, as the estimate is not error-free, a small part of energy can be assigned to the background object.

In the following, details on a further embodiment of the processor 130, especially on the "calculate separate sources power"—stage 402 are provided. This processing block takes the weights computed by 403 and uses them to compute the energies of each object. If $\gamma_i(k,n)$ denotes the weight of the i-th object for the time-frequency bin defined by (k,n), then the energy $E_i(k,n)$ is simply $$E_i(k,n)=W(k,n)^2\gamma_i^2(k,n),$$

Where W(k,n) is the complex time-frequency representation of the downmix signal.

Ideally, the sum of the energies of all objects equals the energy present in the downmix signal, namely $$W(k,n)^2=\sum_{i=1}^{N}E_i(k,n),$$

where N is the number of objects.

This can be achieved in different ways. One embodiment may comprise using a residual object, as already mentioned in the context of weighting factor calculation. The function of the residual object is to represent any missing power in the overall power balance of the output objects, such that their total power is equal to the downmix power in each time/frequency tile.

In other words, in embodiments the processor 130 can be adapted for further determining a weighting factor for an additional background object, wherein the weighting factors are such that the sum of the energies associated with the at least two separated audio sources and the additional background object equal the energy of the converted signal representation.

A related mechanism is defined in the SAOC standard ISO/IEC, "MPEG audio technologies—Part 2: Spatial Audio Object Coding (SAOC)," ISO/IECJTC1/SC29/WG11 (MPEG) FCD 23003-2), on how to allocate any missing energy. Another exemplary strategy may comprise rescaling the weights properly to achieve the desired overall power balance.

In general, if stage 403 provides weights for the background object, this energy may be mapped to the residual object. In the following, more details on the calculation of SAOC OLDs and, optionally, IOCs and the bitstream stage 405 are provided, as it can be carried out in embodiments.

This processing block further processes the power of the audio objects and converts them into SAOC compatible parameters, i.e. OLDs. To this end, object powers are normalized with respect to the power of the object with the highest power resulting in relative power values for each time/frequency tile. These parameters may either be used directly for subsequent SAOC decoder processing or they may be quantized and transmitted/stored as part of an SAOC bitstream. Similarly, IOC parameters may be output or transmitted/stored as part of an SAOC bitstream.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio format transcoder for transcoding an input audio signal, the input audio signal comprising at least two directional audio components, comprising:

a converter configured for converting the input audio signal into a converted signal, the converted signal comprising a converted signal representation and a converted signal direction of arrival;

a position provider configured for providing at least two spatial positions of at least two spatial audio sources; and a processor configured for processing the converted signal representation based on the at least two spatial positions and the converted signal direction of arrival to acquire at least two separated audio source measures, wherein the processor is adapted for determining a weighting factor for each of the at least two separated audio sources, and wherein the processor is adapted for processing the converted signal representation in terms of at least two spatial filters depending on the weighting factors for approximating at least two isolated audio sources with at least two separated audio source signals as the at least two separated audio source measures, or wherein the processor is adapted for estimating a power information for each of the at least two separated audio sources depending on the weighting factors as the at least two separated audio source measures.

2. The audio format transcoder of claim 1, wherein the audio format transcoder is configured for transcoding an input signal according to a directional audio coded signal (DirAC), a B-format signal or a signal from a microphone array.

3. The audio format transcoder of claim 1, wherein the converter is adapted for converting the input signal in terms of a number of frequency bands/subbands and/or time segments/frames.

4. The audio format transcoder of claim 3, wherein the converter is adapted for converting the input audio signal to the converted signal further comprising a diffuseness and/or a reliability measure per frequency band.

5. The audio format transcoder of claim 1, further comprising an SAOC (Spatial Audio Object Coding) encoder configured for encoding the at least two separated audio source signals to acquire an SAOC encoded signal comprising an SAOC downmix component and an SAOC side information component.

6. The audio format transcoder of claim 1, wherein the processor is adapted for converting the powers of the at least two separated audio sources to SAOC-OLDS (Object-Level Differences).

7. The audio format transcoder of claim 6, wherein the processor is adapted for computing an inter-object coherence (IOC) for the at least two separated audio sources.

8. The audio format transcoder of claim 3, wherein the position provider comprises a detector configured for detecting the at least two spatial positions of the at least two spatial audio sources based on the converted signal, wherein the detector is adapted for detecting the at least two spatial positions by a combination of multiple subsequent input signal time segments/frames.

9. The audio format transcoder of claim 8, wherein the detector is adapted for detecting the at least two spatial positions based on a maximum likelihood estimation on a power spatial density of the converted signal.

10. The audio format transcoder of claim 1, wherein the processor is adapted for further determining a weighting factor for an additional background object, wherein the weighting factors are such that a sum of the energies associated with the at least two separated audio sources and the additional background object equal the energy of the converted signal representation.

11. Method for transcoding an input audio signal, the input audio signal comprising at least two directional audio components, comprising:

converting the input audio signal into a converted signal, the converted signal comprising a converted signal representation and the converted signal direction of arrival;

providing at least two spatial positions of the at least two spatial audio sources; and processing the converted signal representation based on the at least two spatial positions to acquire the at least two separated audio source measures, wherein said processing comprises determining a weighting factor for each of the at least two separated audio sources, and processing the converted signal representation using at least two spatial filters depending on the weighting factors for approximating at least two isolated audio sources with at least two separated audio source signals as the at least two separated audio source measures, or estimating a power information for each of the at least two separated audio sources depending on the weighting factors as the at least two separated audio source measures.

12. A non-transitory storage medium having stored thereon a computer program for performing the method for transcoding an input audio signal, the input audio signal comprising at least two directional audio components, said method comprising:

converting the input audio signal into a converted signal, the converted signal comprising a converted signal representation and the converted signal direction of arrival;

providing at least two spatial positions of the at least two spatial audio sources; and processing the converted signal representation based on the at least two spatial positions to acquire the at least two separated audio source measures, wherein said processing comprises determining a weighting factor for each of the at least two separated audio sources, and processing the converted signal representation using at least two spatial filters depending on the weighting factors for approximating at least two isolated audio sources with at least two separated audio source signals as the at least two separated audio source measures, or estimating a power information for each of the at least two separated audio sources depending on the weighting factors as the at least two separated audio source measures, when the computer program runs on a computer or a processor.

* * * * *

UNITED STATES PATENT AND TRADEMARK OFFICE

CERTIFICATE OF CORRECTION

PATENT NO. : 8,891,797 B2
APPLICATION NO. : 13/289252
DATED : November 18, 2014
INVENTOR(S) : Oliver Thiergart et al.

It is certified that error appears in the above-identified patent and that said Letters Patent is hereby corrected as shown below:

Title Page, Item (73) Assignee:

"Fraunhofer-Gesellschaft zur Foerderung der Angewandten Forschung E.V."

should read:

"Fraunhofer-Gesellschaft zur Foerderung der angewandten Forschung e.V."

Signed and Sealed this
Twenty-eighth Day of June, 2016

Michelle K. Lee
*Director of the United States Patent and Trademark Office*